P. WERNER.
APPARATUS FOR SOFTENING MOTION PICTURE FILMS.
APPLICATION FILED JUNE 7, 1919.
1,352,713.
Patented Sept. 14, 1920.
2 SHEETS—SHEET 1.
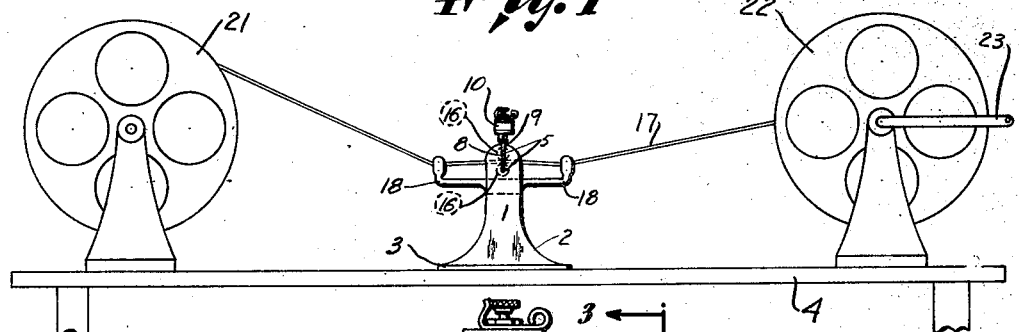
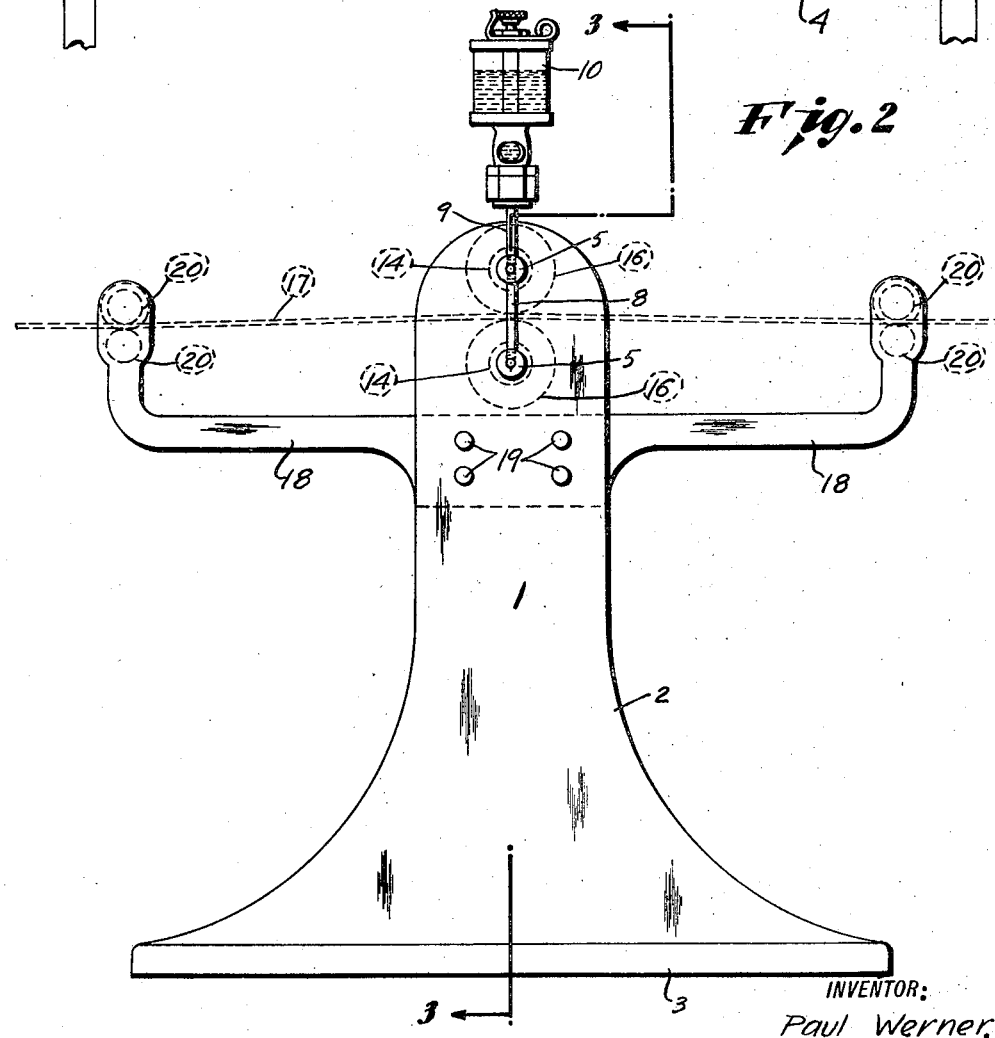
INVENTOR:
Paul Werner,
BY
Hugh K. Wagner
ATTORNEY.

P. WERNER.
APPARATUS FOR SOFTENING MOTION PICTURE FILMS.
APPLICATION FILED JUNE 7, 1919.

1,352,713.

Patented Sept. 14, 1920.
2 SHEETS—SHEET 2.

INVENTOR:
Paul Werner,
BY
Hugh K. Wagner,
ATTORNEY.

UNITED STATES PATENT OFFICE.

PAUL WERNER, OF ST. LOUIS, MISSOURI, ASSIGNOR TO WERNER FILM-PROTECTOR MANUFACTURING COMPANY, OF ST. LOUIS, MISSOURI, A CORPORATION OF MISSOURI.

APPARATUS FOR SOFTENING MOTION-PICTURE FILMS.

1,352,713.  Specification of Letters Patent.  Patented Sept. 14, 1920.

Application filed June 7, 1919. Serial No. 302,525.

*To all whom it may concern:*

Be it known that I, PAUL WERNER, a citizen of the United States, residing at the city of St. Louis, in the State of Missouri, have invented certain new and useful Improvements in Apparatus for Softening Motion-Picture Films, of which the following is a specification.

This invention relates to improvements in apparatus for moistening, lubricating, or anointing motion-picture films as they are unwound from one spool and rewound on another at film rewinding stations or in the operation of exhibiting the motion-pictures or otherwise.

It is customary for a row of perforations to be made in motion-picture films near the edges thereof, each row of perforations extending from one end of the film to the other. These perforations are so spaced apart as to fit the projections on the sprocket-wheel in a motion-picture machine, and each of said perforations in a row is rather close to its neighbor. Celluloid is so brittle and so easily torn and so easily dries and hardens that tearing from one perforation to another is difficult to avoid, and, moreover, when a film tears from one perforation to another, a crack is thereby started that is likely to extend a considerable distance and ruin the film. Thus a valuable film that has cost much to produce may be destroyed and its usefulness ended by the splitting thereof along the line of the said perforations.

My prior invention described in my application for United States Patent Serial No. 288,421, filed April 7, 1919, pertains to film anointing or lubricating devices adapted more particularly for use in connection with an emollient of substantially nonliquid consistency molded or otherwise shaped into a definite form such as that of a stick, candle, or the like, and an object of the present invention is to provide a device of simple construction that is adapted for use in connection with a liquid emollient or the like and for applying said emollient, lubricant, or the like, in a liquid state to the film at the edges thereof during the operation of unwinding the film from one spool and rewinding it on another, so that a film anointed by the device of this invention will not become brittle and crack in the manner described above, and so that films already showing a tendency to harden or crack may again become soft and pliable and in good condition for successful use.

Another object is to provide a device of the character described having guiding mechanism for guiding the film from one film spool to the anointing mechanism and thence to the other film spool.

Another object of my invention is the provision of a machine which will supply the anointing liquid to the inner portion or core of the distributing rollers, and thus cause said liquid to feed through the felt or absorbent material of the rollers and insure a smooth and even application of the liquid to the edge of the film in only the necessary quantity to insure the most satisfactory results.

Among many advantages of this invention is the advantage that this device may be installed readily in connection with mechanism ordinarily used for rewinding films at central film stations, or in connection with motion-picture projecting machines and the appliances usually associated therewith at exhibition houses and the like, and that, when so installed, the life of the film is much prolonged.

Other objects and advantages of the device of this invention are hereinafter described, and are set forth in the claims.

In the accompanying drawings forming part of this specification, in which like numbers of reference denote like parts wherever they occur, Figure 1 is a side elevation of the device of this invention operatively installed in association with the unwinding and winding spools of a motion-picture film;

Fig. 2 is an enlarged view of the side elevation of the device of this invention shown in Fig. 1, but with the film unwinding and winding spools removed;

A pair of oppositely-disposed uprights 1 may be formed in substantially a unitary standard 2 supported by base 3 of any suitable construction adapted to rest on table 4 or the like.

Figure 3:
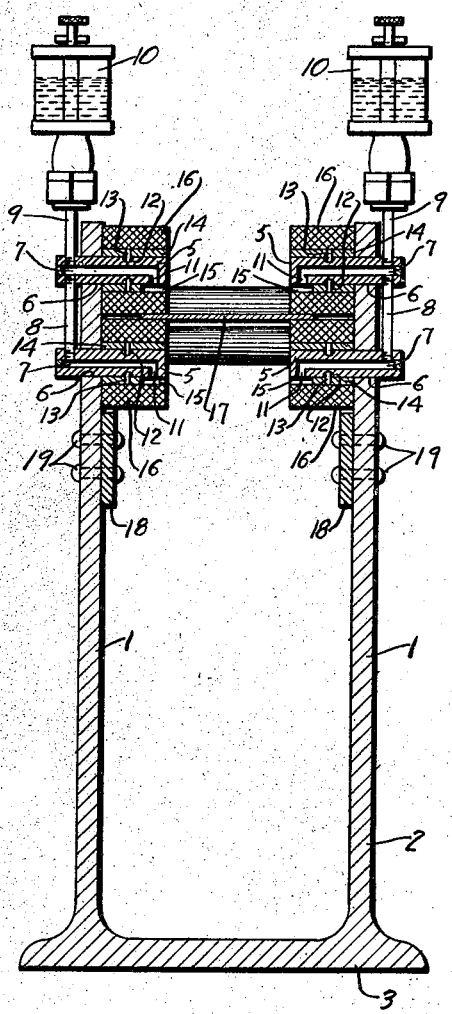
Fig. 3 is a cross-sectional view on the staggered line 3—3 in Fig. 2.
Figure 4:
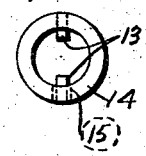
Fig. 4 is an enlarged individual view showing an end elevation of a bushing used in the device of this invention.
Figure 5:
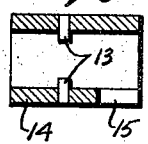
Fig. 5 is a longitudinal cross-sectional view of Fig. 4.

Adjacent the upper ends of uprights 1, perforated shafts 5 may be rigidly mounted through appropriate openings 6 formed in said uprights, there being a pair of said shafts mounted on each of said uprights, substantially as shown in the drawings, and as best seen in Figs. 2 and 3. Perforation 7 of each shaft may be so constructed (see Fig. 3) that one end of each perforation 7 in an associated pair of shafts 5 may be connected with each other by a tube 8 or the like, and an end of perforation 7 of each of the upper shafts 5 of each pair of shafts may be communicated, through a tube 9 or the like, with an oil cup or emollient reservoir 10, said tubes 8 and 9 and said perforations 7 being adapted to form a delivery line to deliver oil or liquid emollient from receptacle or reservoir 10 through outlet 11 of each perforation 7, the particular arrangements as to the system of connection and the like shown in the drawings being by way of illustration only and any suitable system may be substituted therefor adapted to deliver oil or liquid emollient through said outlet 11 from a source of oil or emollient supply.

Each shaft 5 may be provided with an annular groove 12 formed therein, said groove being adapted to receive slidably therein an end of a pair of substantially opposite pins 13 or a plurality of pins 13 borne by each bushing 14, there being a bushing 14 rotatably mounted on each shaft 5, pins 13 slidably mounted in each groove 12, as hereinabove described, and as shown in the drawings, being adapted to prevent the movement of a bushing 14 longitudinally of a shaft 5 on which said bushing is rotatably mounted.

Each bushing 14 is provided with a cut-out portion 15, said cut-out portion being adapted to register with and form a communicating outlet for an associated outlet 11 of shaft perforation 7 at intervals in the course of the rotation of bushing 14 on its shaft 7.

On each bushing 14, rotatably mounted on its shaft 7, as hereinabove described, a roller 16 is rigidly mounted, said roller 16 being of any suitable material, such, for instance, as felt, as is best adapted for distributing oil or emollient to the portions of a film 17 passing between a pair of said rollers 16, the construction and arrangement of the parts hereinabove° described being such that one pair of rollers 16, assembled in operating position, as best seen in Fig. 3, are mounted adjacent the inner wall of one upright 1, one roller 16 of the pair being above its companion roller 16, and the other pair of rollers 16 are mounted opposite said first pair of rollers and adjacent the inner wall of the opposite upright 1, one roller 16 of said second pair of rollers being above its companion roller 16, there being a passage-way space between the two rollers 16 of each pair of rollers adapted to permit opposite edges of a film 17 to ride therethrough in frictional contact with the rollers, the rollers 16 being mounted substantially as shown in said Fig. 3, so that the pair of said rollers adjacent one of said uprights 1 is spaced apart sufficiently from the pair of rollers adjacent the opposite upright 1 to permit the main body of film 17 to ride free through the space between said pairs of rollers, while the edges of said film are in frictional contact with said rollers.

From this construction it will be noted that the hollow shafts form oil ducts or conduits, and are connected in pairs to be fed by the reservoirs 10, one for each set of rollers, and that the oil or liquid is fed from each reservoir through the hollow shafts to the core or center of the felt rollers and near the end of said rollers, thereby gradually saturating the felt and thus insuring the distribution of the liquid in an even and smooth manner and in the desired amount to soften the edges of the film.

The film-guiding mechanism of the present invention comprises a pair of oppositely-positioned cross-frames 18, each frame being secured to an upright, intermediate the opposite end of said frame 18, by any suitable means or in any suitable manner such, for instance, as by means of bolts 19 or the like in the manner shown in the drawings, so that one end of each of said frames 18 extends forwardly of its upright 1, and the other end extends rearwardly thereof with each end of one frame 18 opposite a corresponding end of its companion frame 18, there being a pair of guide-rolls 20 operatively borne by each of said oppositely-corresponding ends of said frames 18, so that one pair of said guide-rolls 20 is rotatably supported across the path of film 17 in advance of the pair of uprights 1 and the other pair of said guide-rolls 20 rotatably supported to the rearward of said pair of uprights 1, the companion rolls 20 of each pair of said guide-rolls being mounted one above the other with sufficient space therebetween for film 17 to ride through said space in frictional contact with said rolls.

A convenient manner of using the device of this invention is shown, by way of illustration, in Fig. 1, wherein standard 2 is mounted on table 4 or the like between an unwinding film reel or spool 21 and a rewinding reel or spool 22, with film 17 strung from unwinding reel 21 to rewinding reel 22 so that said film passes between a pair of guide-rolls 20 and thence between anointing rolls 16 and thence between the second pair of guide-rolls 20, crank 23, associated with rewinding reel 22, being adapted for the well-known operation of revolving said rewinding reel 22 to unwind film 17 from reel 21 and to rewind said film upon reel 22.

As crank 23 is operated to perform its function above described, and as the edges of film 17 pass between the opposite pairs of anointing rollers 16 and in frictional contact therewith, the oil or liquid emollient or the like, flowing from reservoirs 10 to outlets 11 of shaft perforations 7, finds its way to rollers 16 through cut-out portion 15 of bushing 14 as said bushings 14, bearing rollers 16 rigidly mounted thereon, are rotated and said cut-out portion 15 is presented to said outlet 11, and the material, such, for instance, as felt, composing said rollers 16, having absorbed sufficient oil or liquid emollient or the like, will distribute the same to, and apply it on, the edges of film 17 as said edges of film 17 are drawn between a pair of said rollers 16 in frictional contact with said rollers.

It is, of course, understood that the oil or liquid emollient or the like may, if desired, be directly applied to rollers 16 by hand, instead of being conducted from receptacle 10 and automatically applied to rollers 16 through the connecting means 7, 8, 9, 11, and 15 hereinabove described, and it is also understood that, if desired, said rollers 16 may be immersed in oil or liquid emollient or the like before said rollers are mounted in the operative position herein described, and, furthermore, if desired, an unction or ointment may be smeared or otherwise applied to said rollers 16 until the said rollers have become sufficiently soaked therewith to cause the said unction or ointment to be applied from said rollers 16 to a film 17 as said film is drawn between said rollers 16 in frictional contact therewith.

Having thus described this invention, I hereby reserve the benefit of all changes in form, arrangement, order, or use of parts, as it is evident that many minor changes may be made therein without departing from the spirit of this invention or the scope of the following claims.

I claim:

1. A motion-picture film-anointing device comprising mechanism for applying a liquid to the film while said film is being rewound on one reel from another, said mechanism consisting of upper and lower film-guiding rollers, hollow shafts on which said rollers revolve having outlets to discharge liquid to said rollers, a feed pipe leading to said shafts, and a supply reservoir for said feed pipes.

2. A motion-picture film-anointing device comprising mechanism for applying a liquid to the film while said film is being rewound on one reel from another, including members adapted for rolling contact with opposing surfaces of the film adjacent the edges, supports on which said members are rotatively mounted, and liquid feeding ducts formed longitudinally of said supports and opening to the members to supply liquid for delivery to the film through said members.

3. A motion-picture film-anointing device comprising upper and lower sets of rollers arranged for rolling contact with the film adjacent the edges thereof, a shaft for each roller, a bushing mounted on each shaft and connected to the roller, said shaft being formed with a liquid channel opening through the bushing to the interior of the roller.

4. In a motion-picture film-anointing device, rollers arranged in opposed pairs to engage and maintain rolling contact with a running film on opposite sides thereof adjacent the edges, and means adapted for delivering liquid anointing means from a source of supply to said rollers at the central portion of said rollers.

5. In a motion-picture film-anointing device, rollers adapted for applying the anointing means to a running film in frictional contact with said rollers, and means adapted for delivering liquid anointing means from a source of supply to said rollers, said delivering means including a perforated shaft for said rollers mounted centrally of said rollers, and bushings fitting on said shafts, one end of the perforation being adapted to communicate with a roller.

6. In a motion-picture film-anointing device, rollers adapted for applying the anointing means to a running film in rolling contact with said rollers, and means adapted for delivering liquid anointing means from a source of supply to said rollers, said delivering means including perforated shafts and bushings adapted for mounting said rollers rotatably on said shafts, said bushings having a cut-out portion, one end of the shaft perforations communicating with a source of supply of said anointing means and the other end of said shaft perforations being adapted to register with said bushing cut-out portion when said cut-out portion is presented to said other end of said shaft perforation as the roller borne by said bushing is rotated.

7. In a motion-picture film-anointing device, rollers rotatably mounted on perforated shafts, bushings fitting in the rollers and rotatable on said shafts, a bifurcated standard adapted for supporting said shafts with said rollers mounted thereon in opposite pairs, each pair of said rollers being in rolling contact with a running film passing between said rollers, one end of said perforations being adapted to communicate with a source of supply of liquid anointing means, and the other end of said perforations being adapted to provide an outlet for delivering said anointing means therethrough to said rollers.

8. In a motion-picture film-anointing device, rollers adapted for rolling contact with a running film, bushings for said rollers, said bushings having a cut-out portion, perforated shafts having an annular groove, and means borne internally of said bushings and adapted to seat slidably in said annular groove when the bushing is rotatably mounted on the shaft, one end of the shaft perforations being adapted to communicate with a source of supply of liquid anointing means, and the other end of said shaft perforations being adapted to register with the bushing cut-out portion as said cut-out portion is presented thereto when the bushing is rotated on its shaft.

9. A motion-picture film-anointing device comprising a standard, perforated shafts borne by said standard, rollers rotatably mounted on said shafts and adapted for rolling contact with a running film, one end of said shaft perforations being adapted to communicate with a source of supply of liquid anointing means, and the other end of said shaft perforations being adapted to provide an outlet against said rollers for said anointing means, oppositely-extending guide-supports mounted on said standard, and guiding means borne by opposite ends of said supports and adapted frictionally to engage said running film to guide same to and away from said rollers.

10. The combination with motion-picture apparatus of a standard mounted intermediate an unwinding and a rewinding film-reel, rollers mounted on said standard and adapted for rolling contact with the film running from one of said reels to the other to apply anointing means to said film, bushings in said rollers, hollow shafts on which said bushings rotate having liquid discharge means leading to said rollers, and oppositely-extending guiding means borne by said standard, said guiding means being adapted to engage frictionally portions of said running film in advance and to the rear of said rollers to guide said running reel to and away from said rollers.

11. The combination with motion-picture apparatus of a standard mounted intermediate an unwinding and a rewinding film-reel, rollers mounted on said standard and adapted for rolling contact with the running film to apply anointing means to said film, bushings in said rollers, hollow shafts on which said bushings rotate having liquid discharge means leading to said rollers, and oppositely-extending supporting means borne by said standard, and guide-rolls mounted on opposite ends of said supporting means and adapted for frictionally engaging portions of said running film in advance and to the rear of said rollers to guide said film to and away from said rollers.

12. In a machine of the character described, the combination of a frame consisting of a pair of uprights, two pairs of hollow shafts mounted in said uprights in upper and lower relation and formed with an outlet at their inner ends and an inlet at their outer ends, liquid feeding means leading to said inlets, bushings fitting and adapted to revolve on said shafts, and absorbent liquid distributing rollers fitting on said bushings and engaging the edges of the film.

13. In a machine of the character described, the combination of a frame consisting of a pair of uprights, two pairs of hollow shafts mounted in said uprights in upper and lower relation and formed with an outlet at their inner ends and an inlet at their outer ends, liquid feeding means leading to said inlets, bushings fitting and adapted to revolve on said shafts, means engaging the shafts and bushings to hold and guide the bushings in their rotation on said shafts.

In testimony whereof I hereunto affix my signature.

PAUL WERNER.